United States Patent
Chon et al.

(10) Patent No.: US 12,411,015 B2
(45) Date of Patent: Sep. 9, 2025

(54) SYSTEM AND METHOD FOR PREDICTED PINS

(71) Applicant: DoorDash, Inc., San Francisco, CA (US)

(72) Inventors: William Chon, New York, NY (US); Michelle Ma, San Mateo, CA (US); Aniket Patil, Milpitas, CA (US); Li Peng, Oakland, CA (US)

(73) Assignee: DOORDASH, INC., San Francisco, CA (US)

( * ) Notice: Subject to any disclaimer, the term of this patent is extended or adjusted under 35 U.S.C. 154(b) by 285 days.

(21) Appl. No.: 17/843,718

(22) Filed: Jun. 17, 2022

(65) Prior Publication Data
US 2022/0404157 A1  Dec. 22, 2022

Related U.S. Application Data

(60) Provisional application No. 63/212,941, filed on Jun. 21, 2021.

(51) Int. Cl.
*G01C 21/34* (2006.01)
*G06Q 10/08* (2024.01)
(Continued)

(52) U.S. Cl.
CPC ..... *G01C 21/3415* (2013.01); *G01C 21/3476* (2013.01); *G06Q 10/08* (2013.01);
(Continued)

(58) Field of Classification Search
CPC ............ G01C 21/3415; G01C 21/3476; G06Q 10/08; G06Q 10/083; G06Q 10/08355;
(Continued)

(56) References Cited

U.S. PATENT DOCUMENTS

| | | | |
|---|---|---|---|
| 6,384,850 B1 | 5/2002 | McNally et al. | |
| 6,871,325 B1 | 3/2005 | McNally et al. | |
| 6,982,733 B1 | 1/2006 | McNally et al. | |
| 8,146,077 B2 | 3/2012 | McNally et al. | |
| 9,009,060 B2 | 4/2015 | McNally | |
| 9,747,651 B2 | 8/2017 | McNally | |
| 10,621,452 B2 * | 4/2020 | Efland | G05D 1/247 |

(Continued)

FOREIGN PATENT DOCUMENTS

WO  0122289 A1  3/2001

OTHER PUBLICATIONS

Civil Action No. 2:23-CV-2165-WSH, Amended Complaint for Patent Infringement—*Ameranth, Inc.*, Plaintiff, V. *Doordash, Inc., Eat'n Park Restaurants, LLC, and Eat'n Park Hospitality Group, Inc.*, Defendants, Sep. 17, 2024, pp. 1-91.
Unpublished U.S. Appl. No. 18/145,942, filed Dec. 23, 2022.

*Primary Examiner* — Roberto Borja
(74) *Attorney, Agent, or Firm* — Kilpatrick Townsend & Stockton LLP

(57) ABSTRACT

Techniques are provided for determining and updating locations in databases for providing to transport user devices to facilitate picking up (retrieving) an item and delivery. Location points (e.g., for retrieval or delivery) can be measured by transporter devices when an item is retrieved, and a central value can be determined from the measured location points. The central value can be used to update a pin location in a database for a destination, e.g., when more paths by the transport user devices cross a boundary (geofence) around then central value than a boundary around an existing pin location.

18 Claims, 10 Drawing Sheets

(51) Int. Cl.
*G06Q 10/083* (2024.01)
*G06Q 10/0835* (2023.01)
*G06Q 30/0601* (2023.01)
*G08G 1/00* (2006.01)
*H04W 4/02* (2018.01)

(52) U.S. Cl.
CPC ..... *G06Q 10/083* (2013.01); *G06Q 10/08355* (2013.01); *G06Q 10/0838* (2013.01); *G06Q 30/0635* (2013.01); *G08G 1/202* (2013.01); *H04W 4/025* (2013.01)

(58) Field of Classification Search
CPC ........... G06Q 10/0838; G06Q 30/0635; G08G 1/202; H04W 4/025
See application file for complete search history.

(56) References Cited

U.S. PATENT DOCUMENTS

| | | |
|---|---|---|
| 10,970,797 B2 | 4/2021 | McNally |
| 11,276,130 B2 | 3/2022 | McNally |
| 11,842,415 B2 | 12/2023 | McNally |
| 11,847,587 B1 | 12/2023 | McNally |
| 11,904,901 B2 * | 2/2024 | Juel ......................... G08G 1/202 |
| 2014/0249937 A1 | 9/2014 | McNally |
| 2015/0081212 A1 * | 3/2015 | Mitchell ............... H04W 4/022 |
| | | 701/454 |
| 2019/0325382 A1 * | 10/2019 | Koohi .................. G06Q 10/083 |
| 2021/0004728 A1 * | 1/2021 | Uribe Gonzalez .... G08G 1/202 |
| 2021/0019710 A1 * | 1/2021 | Palanisamy ........ G06Q 10/1095 |
| 2021/0049911 A1 * | 2/2021 | Fremlin ................ G08G 1/202 |
| 2021/0285777 A1 * | 9/2021 | Ostadzadeh ....... G01C 21/3617 |

* cited by examiner

| Merchant ID | lat | lng |
|---|---|---|
| 423926 | 39.96606863 | -75.52729729 |
| 1231562 | -27.5616853 | 151.9375322 |
| 1158280 | 45.52490456 | -122.5395634 |
| 426471 | 30.35917539 | -95.58806847 |
| 1157936 | 42.33362781 | -122.8628164 |
| 529275 | 40.0877424 | -75.39617205 |

*FIG. 6*

SYSTEM AND METHOD FOR PREDICTED PINS

CROSS-REFERENCES TO RELATED APPLICATIONS

This application is a non-provisional of U.S. provisional patent application No. 63/212,941, filed on Jun. 21, 2021, which is herein incorporated by reference in its entirety.

BACKGROUND

Users rely on mobile device for navigation to many different destinations (including intermediate and final destinations) or to track movement of others devices. Some such users may be end users of a delivery application, or the transporters that retrieve and deliver items to an end user. To provide the navigation, a location of a destination needs to be known. But given that a delivery application can have many end users and many retrieval locations, it can be difficult to always provide accurate navigation. And it can be difficult to know when a destination location is inaccurate.

BRIEF SUMMARY

Embodiments of the present disclosure provide for improved methods and systems for determining and updating locations in databases for providing to transport user devices to facilitate picking up (retrieving) an item and delivery. Location points (e.g., for retrieval or delivery) can be measured by transporter devices when an item is retrieved, and a central value can be determined from the measured location points. The central value can be used to update a pin location in a database for a destination, e.g., when more paths by the transport user devices cross a boundary (geofence) around then central value than a boundary around an existing pin location.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

BRIEF DESCRIPTION OF THE DRAWINGS

FIG. 6 shows a table with new pin locations corresponding to store identifiers according to implementations.

DETAILED DESCRIPTION

Figure 1:
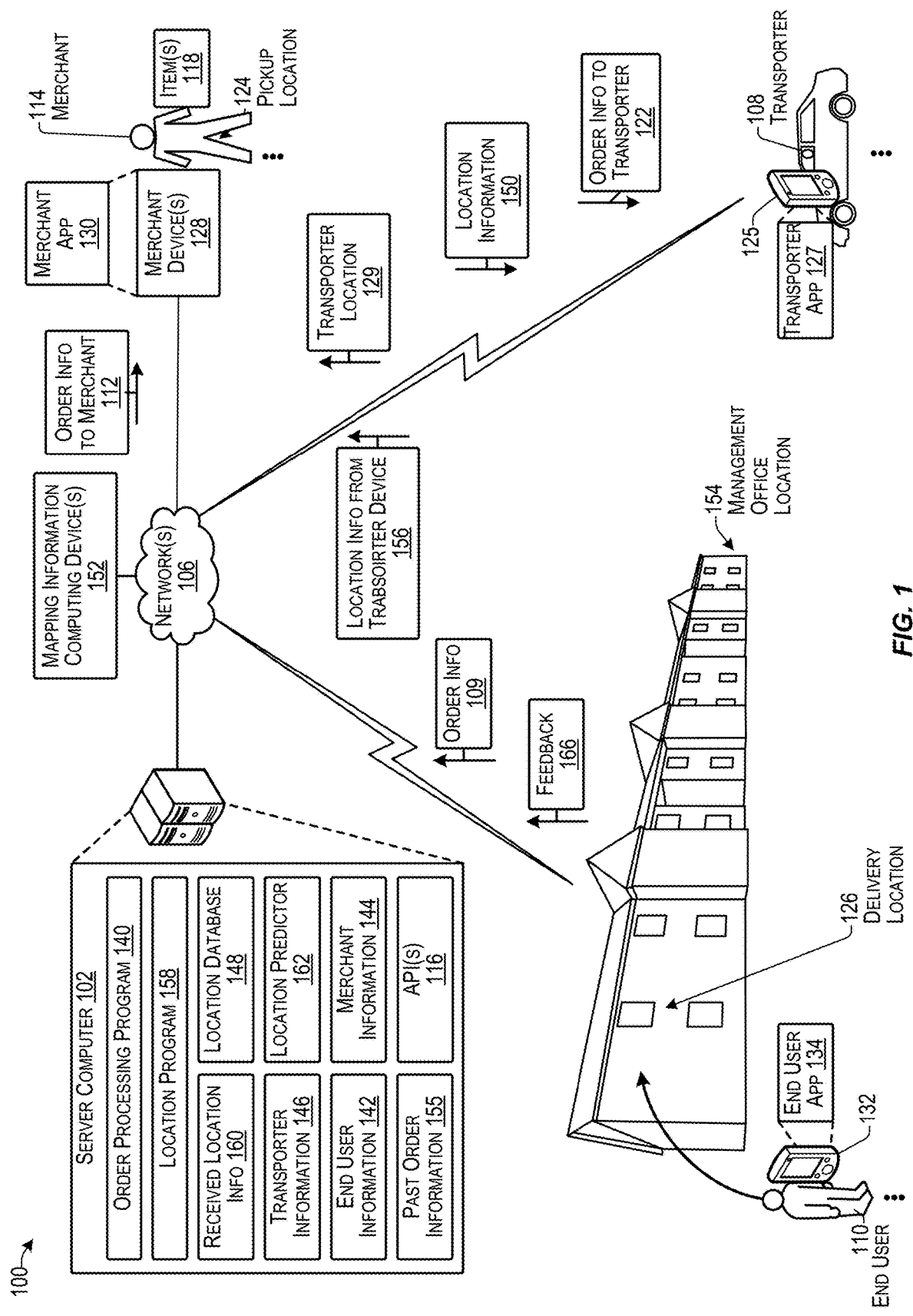
FIG. 1 illustrates an example distributed computing system able to determine and update pin location for delivery destinations according to some implementations.

A transporter may retrieve items from a retrieval location and deliver the items to an end user at a delivery location. However, some of the retrieval and delivery locations can be inaccurate. For example, a user can enter location information incorrectly or a mapping service can have incorrect locations in a database. Such an incorrect location might occur in the context of a shopping mall, where an actress the mall can have a default position in the center of a shopping mall but then the retrieval location is inside of the shopping mall but far from the center. The incorrect information can lead to a pin location that is inaccurate for navigation.

For example, in the case of apartment complexes, condominium housing, or other dense housing locations, a stored pin location of a delivery location may not identify the correct location for a particular housing unit. Instead, for instance, the pin location may point to the management office of the housing complex or some other random location on the premises. Similar errors may be encountered in some types of office complexes, motels, hotels, or other types of densely populated locations.

Embodiments can provide a software tool that allows for an automatic correction of an errant pin location. Fixing pins manually can be a laborious process. Embodiments can use location measurements (e.g., retrieval or delivery points) from the transporter devices (e.g., phones) of transporters that deliver the items, where the locations are measured when a transporter indicates on a user interface (e.g., a touch screen or by voice command) that an item has been delivered or retrieved. Such measured location points can be used to determine a central value (e.g., a median or mean) to replace the errant pin location. Suh a process can be performed periodically, e.g., weekly or monthly. The pin location can be updated in various ways in a database. Such techniques can be used to identify retrieval and delivery locations that are inaccurate and correct them.

Such solutions provide improved efficiency (more accurate pins lead to better navigation) and less support tickets (transporters will need to contact support less in order to pick up their order). Further, embodiment can be scalable and take full advantage of the location data collected from transporter devices. Whether the system has 100,000 retrieval locations on the platform or 1,000,000, such solutions will work fine in both cases with no additional work. embodiments can also provide a point of data that is separate from mapping service.

I. Distributed Computing System

Some implementations relate to a service that includes a network of a plurality of transporters that are paid to pick up and deliver items. End users may place orders through the service for desired items from retrieval locations (e.g., merchants), and the transporters deliver the items to the end users at delivery locations indicated by or otherwise associated with the end users. The system may determine a new pin location for specific retrieval and delivery locations based in part on the latitudes and longitudes captured by transporter devices during prior deliveries. Further, while some examples are described in use with a delivery service, implementations herein are not limited to use with a delivery service, and may be implemented with other systems, services, and the like.

FIG. 1 illustrates an example distributed computing system able to determine and update pin location for delivery destinations according to some implementations. For instance, the system 100 may enable a server computer 102 to store, predict, and update pin locations based on location information received over one or more networks 106 from one or more transporters 108. The predicted pin locations may be subsequently provided to the transporters 108, such as for use in making subsequent retrievals from retrieval locations and subsequent deliveries to the delivery locations.

Some example implementations are described in the environment of server computer 102 that manages a network of transporters 108 for delivering items to end users 110 in high density housing locations and other densely populated locations. However, implementations herein are not limited to the particular examples provided, and may be extended to other service environments, other system architectures, other types of transporters, other types of deliveries, other types of location, and so forth, as will be apparent to those of skill in the art in light of the disclosure herein.

In the illustrated example, server computer 102 may be configured to provide a service to receive, over the one or more networks 106, order information 109 from an end user 110. For instance, the order information 109 may include an indication of an item and an indication of a delivery location. The delivery location may be explicitly specified with the order information or, alternatively, may be implied to be a default delivery location already associated with an end user account of the end user 110. Based on the order information 109 received from the end user 110, the server computer 102 may send order information 112 to at least one particular merchant 114 of a plurality of merchants (i.e. retrieval location from a plurality of retrieval locations) that will provide a requested item 118. Merchant 114 may receive the order information 112, and may respond with a confirmation to confirm that the request for item 118 has been received and item 118 will be provided by merchant 114.

In response to receiving the confirmation from particular merchant 114, server computer 102 may send order information 122 to a transporter device 125 of a selected transporter 108 who, upon accepting the delivery job, will pick up the order from merchant 114 and deliver the order to end user 110. For instance, each merchant 114 may be associated with a respective pickup (retrieval) location 124, which may typically be the merchant's place of business. Furthermore, each end user 110 may be associated with a respective delivery location 126, which as mentioned above, may be determined by server computer 102 when order information 109 is received from end user 110.

Order information 122 sent to the transporter device 125 may include item information, the pickup location 124 for the order, the pickup time, the delivery location 126, and a delivery time for the order. Further, while one transporter 108, one end user 110, and one merchant 114 are shown in this example for clarity of illustration, a large number of transporters 108, end users 110, and merchants 114 may individually participate in the system 100.

In the illustrated example, server computer 102 is able to communicate with the transporter device 125 over the one or more networks 106. Each transporter 108 may be associated with a respective transporter device 125 that may execute a respective instance of a transporter application 127. For example, the transporters 108 may use transporter devices 125, such as smart phones, tablet computers, wearable computing devices, laptops, or the like, as further enumerated elsewhere herein, and these transporter devices 125 may have installed thereon the transporter application 127. Transporter application 127 may be configured to receive order information 122 from the server computer 102 to provide a particular transporter 108 with information for picking up a particular order from a merchant's pickup location 124 and for delivering the order to an end user's delivery location 126. Transporter application 127 may further enable the transporter 108 to respond to the server computer 102 to confirm acceptance of a delivery job.

Additionally, in some cases, transporter application 127 may provide server computer 102 with an indication of a current transporter location 129 (also called a location point, such as a retrieval location point or a delivery location point) of a particular transporter 108. For example, the transporter application 127 may obtain the current location from a GPS receiver (not shown in FIG. 1) included onboard the transporter device 125. As mentioned above, the term "GPS" as used herein may include any global navigation satellite system (GNSS) such as the Global Positioning Satellite (GPS) system, the Russian Global Navigation Satellite System (GLONASS), the Chinese BeiDou Navigation Satellite System (BDS), the European Union's Galileo system, the Japanese Quasi-Zenith Satellite System (QZSS), the Indian Regional Navigation Satellite System (IRNSS), any other satellite-based location positioning system, or any similar such system for providing accurate indications of current location to a mobile device. Accordingly the GPS receiver herein may be able to determine transporter location 129 (e.g., latitude and longitude) of the transporter device 125 based on received signals from one or more satellite positioning systems or the like. Additionally, in some examples, the transporter application 127 and the server computer 102 may communicate with each other via one or more application programming interfaces (APIs) 116.

Each merchant device 128 may be associated with a respective merchant 114. Each merchant device 128 may be a computing device, such as a desktop, laptop, tablet, smart phone, or the like, and may include a respective instance of a merchant application 130 that executes on the respective merchant device 128. For example, merchant application 130 may be configured to communicate with server computer 102, such as for receiving the order information 112 and for sending a confirmation. In some examples, the merchant application 130 and the server computer 102 may communicate with each other via one or more APIs 116

In addition, end users 110 may be associated with respective end user devices 132 that may execute respective instances of an end user application 134. For example, the end users 110 may use the end user devices 132, such as smart phones, tablet computers, wearable computing devices, laptops, desktops, or the like, and these end user devices 132 may have installed thereon or may otherwise access end user application 134. End user application 134 may enable end user 110 to select one or more items 118 to purchase from one or more of the merchants 114 to be delivered to the end user 110 by one or more of the transporters 108. For example, end user application 134 may present one or more UIs on a display of the transporter device 132 for enabling end user 110 to select one or more items 118 for an order. In some examples, end user application 134 and server computer 102 may communicate with each other via one or more APIs 116. Additionally, or alternatively, end user application 134 may be a browser, or the like, and end user 110 may navigate to a website or load a web application associated with the service provider 104, and may use the website or web application received from server computer(s) 102 to place an order.

The one or more networks 106 can include any appropriate network, including a wide area network, such as the Internet; a local area network, such an intranet; a wireless network, such as a cellular network, a local wireless network, such as Wi-Fi and/or close-range wireless communications, such as BLUETOOTH®; a wired network; or any other such network, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, server computer 102, merchant device(s) 128, end user device(s) 132, and/or transporter device(s) 125 are able to communicate over the one or more networks 106 using wired or wireless connections and combinations thereof.

In the illustrated example, server computer 102 includes an order processing program 140 that may be executed on the server computer 102 to provide, at least in part, the functionality attributed to server computer 102. Order processing program 140 may receive order information 109 from end user 110 and may associate order information 109 with end user information 142 and merchant information 144. For instance, based on end user identifying information that may be included with order information 109, order processing program 140 may associate particular order information 109 with a particular end user account. Further, based on a particular merchant 114 identified by order information 109, order processing program 140 may associate the order information 109 with a merchant account of a particular merchant 114 to send order information 112 to merchant 114.

In addition, order processing program 140 may access transporter information 146 to determine transporter contact information for sending order information 122 to a particular transporter 108 to determine whether the particular transporter 108 is willing to accept the delivery job of delivering the order to the end user 110. The particular transporter 108 may use transporter application 127 on the transporter device 125 to receive a message with information about the order, and to respond with acceptance of the delivery job if the job is accepted. The particular transporter 108 may subsequently pick up the order from the particular merchant 114 and deliver the order to the particular end user 110 at a specified delivery location 126.

In the case of high density housing locations and other densely populated locations (including for the merchants), transporter 108 may be provided an updated pin location, e.g., determined by analyzing locations points (e.g., measured by GPS) of previous pickups (retrievals) retrieved by order processing program 140 from a location database 148. For example, server computer 102 may maintain location database 148, which may be a relational database or any other suitable type of data structure. Location database 148 may include pin locations for end users (delivery locations) and merchants (retrieval locations) determined from measurements of transporter devices 125. When order information 109 is received from end user device 132, order processing program 140 may correlate the end user account and/or a specified delivery location with location database 148 to determine a current pin location for the end user.

Similarly, order processing program 140 may correlate the merchant account and/or a specified retrieval location with location database 148 to determine a current location for the merchant.

Location information 150 can be sent to the transporter application 127 executing on transporter device 125. For example, transporter application 127 may use location information 150 to generate a UI including a map indicating pickup location 124, and then subsequently delivery location 126. As one example, server computer 102 may provide all the location for generating the map in the UI on the transporter device. As another example, transporter application 127 or server computer 102 may provide the location to a third party location computing device 152 that may provide location information 150 to the transporter device 125 to enable presentation of a UI with a map to pickup location 124 and delivery location 126.

When transporter 108 has completed retrieval of the item at pickup location 126, transporter 108 may use transporter application 127 to inform order processing program 140 that the retrieval has been completed. At this time, transporter application 127 can obtain a retrieval location point. Upon receiving the indication of completion, the order processing program 140 may store information related to the order and completion of the order as past order information 155, including the measured retrieval location point.

When transporter 108 has completed delivery of the order to delivery location 126, transporter 108 may use transporter application 127 to inform order processing program 140 that the delivery has been completed. At this time, transporter application 127 can obtain a delivery location point. Upon receiving the indication of completion, the order processing program 140 may store information related to the order and completion of the order as past order information 155, including the measured delivery location point.

Order processing program 140 may receive location information 156 (measured location points) from the transporter device 125 and may provide this received information to a location program 158 that may be executed on server computer 102. For example, the location program 158 may receive location information 156 and may temporarily store the location information with received location information 160. Location program 158 may correlate the received information with the end user account and/or the delivery location 126 in the end user information 142, or with the merchant account and/or pickup location 126 in merchant information 144.

In addition, location program 158 may use the received image as input to a location predictor 162. Location predictor 162 may be executed to determine whether to rely on existing pin location for the end user and/or the merchant (retrieval location) or to use a new central value determined from location information 156 measured from transporter devices 125 at times of pickup or delivery, respectively.

II. Pin Location Uses and Potential Inaccuracy

As described in the previous section, pin locations corresponding to a retrieval location and/or a delivery location can be provided to a transporter device. The pin locations for a retrieval location (e.g., a merchant) and an end user can be stored in a database for use when an order is received from a particular end user for a particular retrieval location. The transporter device can use a pin location for navigation to the retrieval location and/or the delivery location.

Pins are important because they are a physical representation of where different entities (e.g., merchants and end users) are located across many different areas of a codebase of the system. And the pins can be used for various functionality. For example, the pins can be used for a geofence (e.g., around a merchant or an end user), which can be used to trigger notifications or other purposes. A geofence can correspond to a boundary (e.g., circular) around a pin location. A pin can also be to determine whether a transporter is near a retrieval/delivery location, which can enable app functionality for swiping to pick up or confirm delivery. As mentioned above, a pin can be used for navigation, and the pin can appear on a user interface of an application for the delivery service on a user device.

A pin can also be used to track the time spent on different legs of the delivery. In a delivery life cycle, there are three main steps. There is the time to a retrieval location, which may be impacted by traffic. There is a wait at the retrieval location (e.g., if food at a restaurant is not ready), and then there is also time getting from the retrieval to the end user. A pin can be used as a trigger to distinguish these different legs of the delivery trip. In some implementations, e.g. offense around the pin locations is used to transition from one leg to another. Accordingly, a pin can also be used to determine a time that it takes a transporter to reach a retrieval location from the time of accepting an order. A pin can also be used to determine a wait metric, e.g., for how long a transporter needs to wait to pick up an item once reaching the retrieval location.

Figure 2:
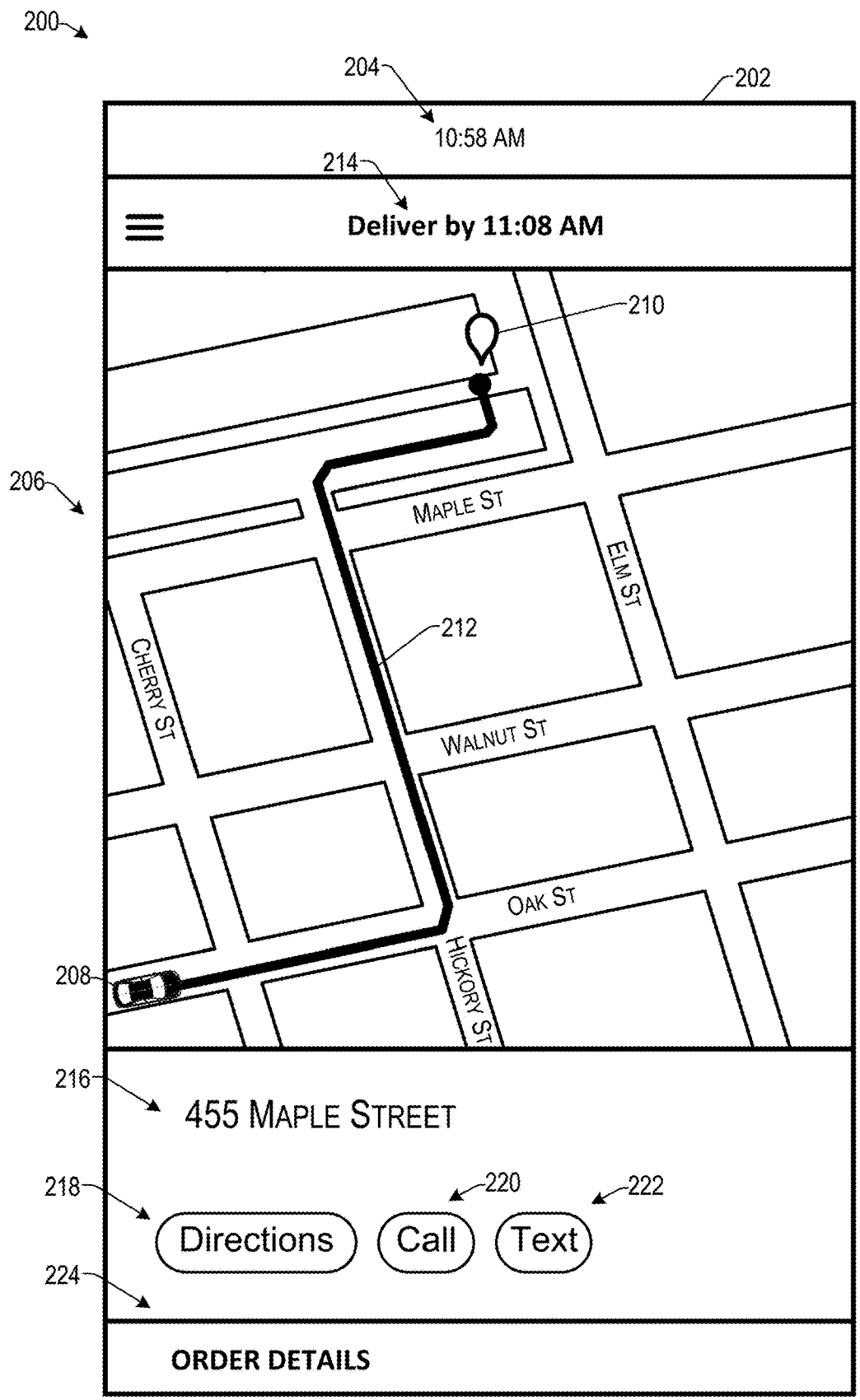
FIG. 2 illustrates an example user interface presented on a transporter device according to some implementations.

FIG. 2 illustrates an example user interface presented on a transporter device 225 according to some implementations. In the illustrated example, transporter device 225 may execute the transporter application (not shown in FIG. 2) to present a user interface 200 on a display 202 of transporter device 225. Transporter device 225 may further present a current time 204 on display 202.

User interface 200 includes a map 206 that may include a first icon 208 representative of a current indicated location of transporter device 225 in relation to map 206. For instance, the current location of transporter device 125 may be determined by transporter application 127, such as based on GPS information or other location information received from the transporter device 225, e.g., from a GPS receiver included in transporter device 225. Map 206 may further present a second icon for a target location 210, such as a pin or the like, corresponding to the location to which the transporter is instructed to proceed to perform a retrieval or a delivery. User interface 200 may further present an indicated route 212 on map 206 for the transporter to follow to navigate from the current location to target location 210 represented by a second icon.

User interface 200 may further include an indication of a delivery time 214 by which the transporter is expected to deliver an item to the delivery location of the end user who placed the order for the item being delivered. In addition, user interface 200 may present a text version 216 of the delivery location, as well as several other virtual controls, such as buttons. Examples of virtual controls include a first virtual control 218 selectable for accessing text directions from current location of first icon 208 to target location 210. The virtual controls may further include a second virtual control 220 that may be selectable for calling the end user for the current delivery, and a third virtual control 222 that may be selectable for sending a text message to the end user. In addition, a fourth virtual control 224 may be selectable to view details of the order that the transporter is currently delivering.

The pin location can be saved as a latitude and longitude. The initial value for pin location can be determined in various ways. For example, the latitude and longitude coordinates can be provided directly by a new user (e.g., merchant user or end user). As another example, a user can provide an address, and a mapping service can use the address to determine the lat/log coordinates.

Sometimes, the pin location can be inaccurate. For example, the value provided by a user may be inaccurate as a result of data entry or just errors in determining the coordinates. Further, the coordinates may not be in error, but simply not optimal for a given location, such as when the address and the actual location differ by more than 50 or 100 m. In some implementations, an accuracy can be identified as a difference of 50 or hundred meters more than what is provided from a mapping service. But the mapping service can also have inaccuracies, e.g., when an address is new. Such an incorrect location might also occur in the context of a shopping mall, where an actress the mall can have a default position in the center of a shopping mall but then the retrieval location is inside of the shopping mall but far from the center. As an example for end users, the address may correspond to a main office of the complex, and not to a particular apartment, condo, or room. To remedy such situations, embodiments can dynamically update the coordinates of pin locations based on measurements from the transporter devices.

Figure 3:
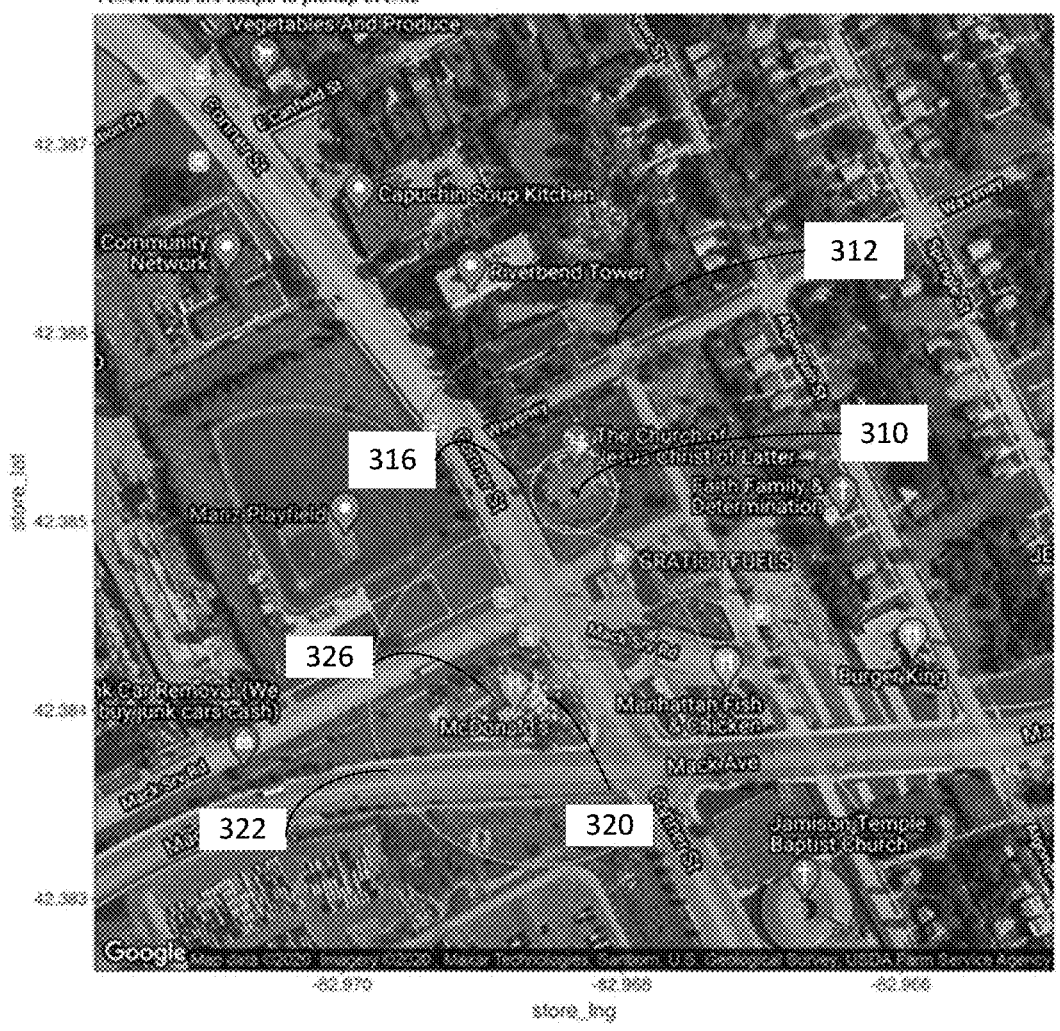
FIG. 3 shows an inaccuracy in the pin for a retrieval location according to implementations.

FIG. 3 shows an inaccuracy in the pin for a retrieval location according to implementations. A map 300 shows a saved pin location 310 that is far from a retrieval location 320. A first large boundary 312 around saved pin location 310 shows that the two pin locations are sufficiently far away from each other to be considered an inaccuracy, in this example. Similarly, a second large boundary 322 around retrieval location 320 shows the same inaccuracy. A first geofence 316 is shown around the saved pin location 310. A second geofence 326 is shown around retrieval location 320.

Given the inaccuracy, a lot of the processes described for FIGS. 1 and 2 will not work optimally. For example, first geofence 316 will not properly trigger that a retrieval has occurred when an item is picked up from retrieval location 320, as the transporter will likely not cross first geofence 316. Fixing a merchant pin that is inaccurate (e.g., by >=50 or 100 m) will improve the delivery time significantly, e.g., 30 to 60 seconds, e.g., by avoiding long wait times trying to find a retrieval location and you pick up an item.

Embodiments can correct such pin locations using location measurements of transporter devices when picking up items from retrieval location 320, as described in more detail below.

III. Correction of Pin Location

To correct an inaccurate pin location in a database of the delivery system (e.g., location database 148 of server computer 102), embodiments can use location measurements (also referred to as retrieval location points or delivery location points) of transporter devices (e.g., transporter devices 125). Such location measurements can be made my transporter indicates that an item has been retrieved (e.g., by swiping on a transporter/transporter application) for correcting the pin for a retrieval location or that a delivery has been completed for correcting the pin for a delivery location. Such indications via a user interface can cause signals (e.g., a retrieval signal or delivery signal) to be sent to a server computer, which can analyze the location measurements to correct an inaccurate pin location.

As an example, for each of the merchants on the platform (system), the system can analyze the retrievals/deliveries that took place over a specified period of time (e.g., last 28 days). For each retrieval and/or delivery, a corresponding location measurement can be identified. For instance, the timestamp of when the transporter "swiped to pick up" the item can be identified, or swiped to confirm delivery: both examples of input indicating a task has been completed. Various location measurements can be made and saved with corresponding timestamps in a table. The timestamp corresponding to the user indication on the transporter device can be used to identify the corresponding location, e.g., from a table of location measurements.

The location measurements for all the retrievals/deliveries over the specified time can be analyzed to determine a central value, e.g., the median or mean of the lat/lng, which can be used to update a corresponding pin location. Such a process can be referred to as predicting a pin, or an optimal pin. As part of the analysis, some post-processing can be performed on the data in order to account for edge cases (e.g., a merchant that recently moved addresses). The pin locations can be updated in one or more databases and bulk and are using an automated process.

An accuracy can be determined for the central value determined from the measurements. The accuracy can be determined relative to the existing pin location, e.g., comparing a performance of each pin location. As described in more detail below, the performance can be measured based on a number of paths of transporters (i.e., for orders corresponding to the target location) cross boundaries around the central value and the existing pin location. An accuracy would be higher for a higher number or percentage of paths that cross a given boundary.

A. Measurement of Location

Embodiments of the system can receive location measurements from transporter devices when performing a delivery, including to and from a retrieval location. Such measurements can be used to update a pin location with a more accurate value, as described herein. The transporter devices can perform the location measurements periodically (e.g., at the request of a transporter application) or on-demand.

Figure 4:
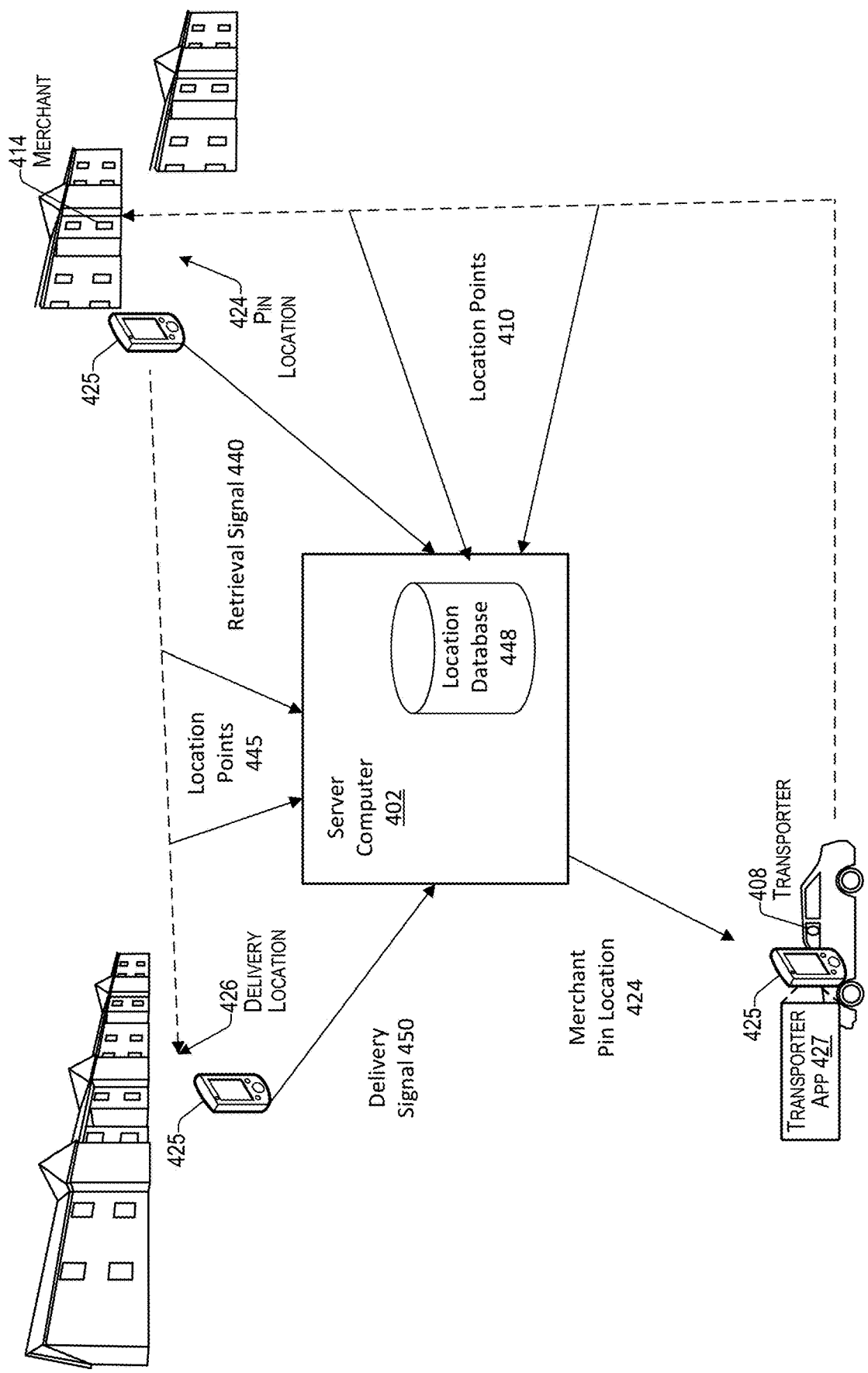
FIG. 4 shows a diagram illustrating location measurements along a path of a transporter as part of a delivery order according to implementations.

FIG. 4 shows a diagram illustrating location measurements along a path of a transporter as part of a delivery order according to implementations. Elements of FIG. 4 can correspond to FIG. 1, and can function in a similar manner.

A transporter 408 can accept an order using a transporter application 427 running on transporter device 425. After accepting the order, server computer 402 can provide a merchant pin location 424, which can be used to provide navigation information on transporter device 425. Merchant pin location 424 can be saved in location database 448 in association with a merchant identifier for merchant 414, which is involved in the order.

While traveling to merchant pin location 424, transporter device 425 can measure locations to obtain location points 410 along the way. The location measurements can be periodic and/or responsive to particular user interactions, e.g., with transporter application 427. The periodicaty of such measurements can be provided by transporter application 427. Location points 410 can provide a retrieval path (e.g., 5 seconds before retrieval) or a final retrieval location point, e.g., in combination with a time stamp determined at time of retrieval.

Upon arrival at the retrieval location corresponding to merchant pin location 424 and retreiving one or more items, transporter 408 can provide an input (e.g., to transporter application 427) indicating that the transporter has retrieved the one or more items at the retrieval location. Various actions can be taken in response to the input. For example, a time stamp can be measured and sent to server computer 402. When location points are measured and provided to server computer (e.g., each with a corresponding time stamp), server computer 402 can correlate the time stamps to determine a corresponding location point (e.g., the location point measured closest in time to time stamp, indicating retrieval of the items). Since transporter 408 is retrieving the item(s) at that instant, that time stamp and any corresponding location point (a retrieval location point) is a good proxy for where merchant 414 is actually located. As another example, a location measurement can be made in response to the input to obtain the retrieval point. Thus, a time stamp would not be needed in such an example.

The input by transporter 408 can be made at various times, e.g., at a time of checking in at merchant 414 or after retrieving the one or more items at merchant 414. For example, transporter 408 may need to wait for the item(s) to be ready, but can provide an indication of the retrieval while waiting. Such an input may be referred to as "checking in." As another example, transporter 408 can provide an input that the one or more items have been retrieved. In either example, the input can indicate retrieval by the transporter of the one or more items at the retrieval location.

After the input, a retrieval signal can be sent to server computer 402, where the retrieval signal indicates a retrieval location point measured by a respective transporter device. As examples, the retrieval signal can include a time stamp and/or a retrieval location point.

After retrieving the item(s), transporter 408 can travel to delivery location 426. A delivery pin location corresponding to delivery location 426 can be provided at various times, e.g., when accepting the order (e.g., along with receiving merchant pin location 424) or after server computer 402 receives retrieval signal 440. While traveling, location points 445 can be measured. Location points 445 can be measured in a similar way as locations points 410, but provide for a delivery path (e.g., 5 seconds before delivery) or a final delivery location point, whereas location points 410 can provide a retrieval path or a final retrieval location point, as described above.

For delivery, transporter 408 may provide a similar input as for retrieval, e.g., an input indicating delivery by the transporter of the one or more items to the delivery location. A time stamp can be measured and/or a delivery location point in response to the input. After the input, a delivery signal 450 can be generated and sent to server computer 402. Delivery signal 450 can indicate a delivery location point measured by transporter device 425, e.g., as described above, such as with a time stamp and/or a location point measured in response to the input.

Accordingly, for each retrieval and delivery for any transporter to merchant 414 (retrieval location) or delivery location 426, a corresponding latitude and longitude (e.g., determined from the GPS) can be measured as a location point. Such location points can be used to predict an accurate pin location for the retrieval location and the delivery location.

B. Prediction and Accuracy of New Pin Location

The retrieval/delivery location points for historical retrievals/deliveries can be analyzed to determine an improved pin location. The analysis can determine a central value, e.g., the median or mean of the retrieval/delivery location points (e.g., latitude/longitude).

Figure 5:
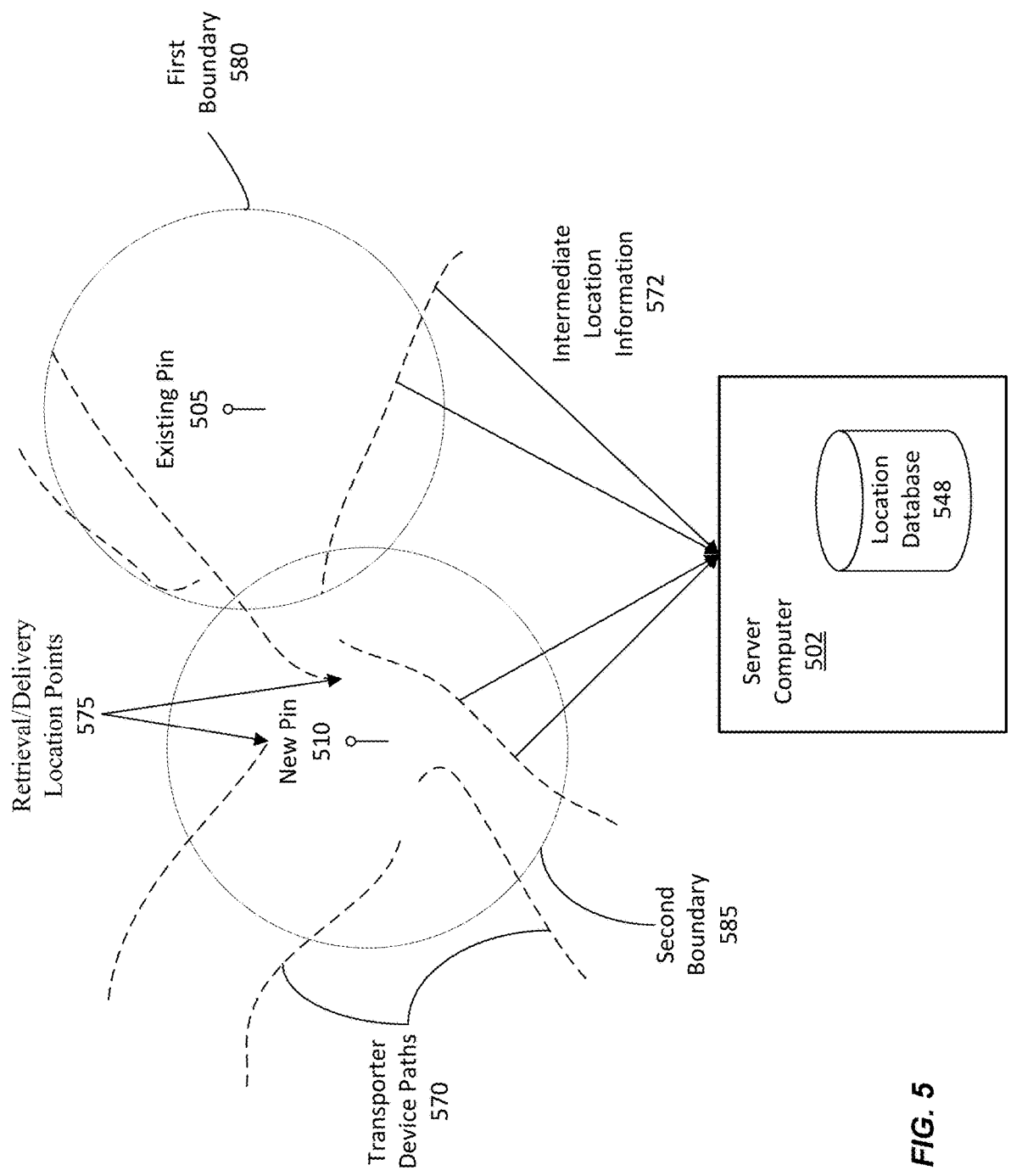
FIG. 5 illustrates use of location measurements to predict a new pin location and determination of accuracy of the new pin location according to implementations.

FIG. 5 illustrates use of location measurements to predict a new pin location and determination of accuracy of the new pin location according to implementations. Server computer 502 can perform functionality the same or similar to other server computers described herein. Server computer 502 can receive location information from transporter devices, as described above, for determining a new pin location for a retrieval location (e.g., a merchant) or a delivery location (e.g., for an and user). Aspects of FIG. 5 can be used to determine a new pin location for retrievals or deliveries.

Transporter device paths 570 show the geographical paths taken by a set of transporter devices as they are traveling to make a retrieval or a delivery. The transporter devices can receive an existing pin 505 as a location for making the retrieval/delivery. But the actual retrieval/delivery location may differ from existing pin 505. As the transporter devices travel to make the retrieval/delivery, intermediate location information 572 can be measured and provided to server computer 502. Intermediate location information 572 can include latitude and longitudinal coordinates corresponding to certain times in the past; such times can also be transmitted to server computer 502 from the transporter devices. At or near an end of a path, retrieval/delivery location points 575 can be measured, as described herein. For example, a timestamp for a retrieval/delivery can be determined, and then later correlated to a most recent one of intermediate location information 572.

As shown, the final location points (retrieval/delivery location points 575) are not right next to existing pin 505, e.g., on average retrieval/delivery location points 575 can be greater than 50 or 100 meters away from existing pin 505. Such a discrepancy can indicate an accuracy in existing pin 505. Retrieval/delivery location points 575 can be analyzed to determine a new pin 510, e.g., as part of a triangulation to determine a more accurate pin location. The historical retrieval/delivery locations used to determine new pin 510 can be limited to a certain time period, e.g., the last four weeks or 30 days.

In some embodiments, a central value can be determined from retrieval/delivery location points. For example, a median latitude can be obtained from the latitude coordinates of retrieval/delivery location points 575. Such a median latitude can correspond to the location point at which about 50% of the location points are to the left and about 50% of the location points are to the right. A median longitude can be obtained from the longitude coordinates of retrieval/delivery location points 575. Such a median longitude can correspond to the location point (which may be different than location point used for latitude) at which about 50% of the location points are above and about 50% of the location points are below. In other implementations, other statistical values can be used, such as an average (mean). A weighted average could be used if certain measurements are assigned a greater confidence level, e.g., a transporter is using a transporter user device that more accurately measures location.

A specific set of retrieval/delivery location points 575 can be identified for use in determining new pin 510. For example, any deliveries that had issues for an item mapping picked up correctly or delivery correctly can be filtered out. As another example, any location points that are significantly far from any of the other location points can be discarded, e.g., as can result from a transporter forgetting to provide input in a timely manner. For instance, a transporter may provide the input while driving away from a retrieval location. Such location measurements are not an accurate measure, and should not be used. Errors can also occur if a merchant or end-user moves. As a result, retrieval/delivery location points can cluster into two separate areas, which would likely be significantly apart from each other. In such a case, only the more recent measurements can be used.

In this manner, new pin 510 can be determined based on location of transporter user devices at times corresponding to an actual interaction with a merchant or end-user, thereby better representing a location for representing the merchant or end-user, e.g., for navigation. New pin 510 can be used to update the location in one or more databases, thereby replacing existing pin 505 for use in providing to transporter devices. The pin locations can be updated in one or more databases and bulk and are using an automated process.

Before updating, one or more checks can be formed to confirm that new pin 510 is indeed more accurate than existing pin 505. One check can be determining that new pin 510 is sufficiently different than existing pin 505 in order to update a database with the new value. Such criteria might be that the difference is at least a specified distance, e.g. 50, 75, or 100 m.

Another check can be an accuracy check, which can be part of a validation stage. Once the system has the predicted coordinates, the system can validate that the predicted coordinates are more accurate than the actual store coordinates by seeing which pin location has more transporters crossing a boundary (e.g., a 25 meter geofence) around each pin location.

FIG. 5 shows a first boundary 580 around existing pin 505, and a second boundary 585 around new pin 510. As part of the accuracy check, it can be determined whether more transporter device paths 570 cross second boundary 585 then cross first boundary 580. In this example, more of transporter device paths 570 cross second boundary 585 then cross first boundary 580, indicating that new pin 510 is more accurate. Specifically, 6 out of 7 of the transporter device paths 570 cross second boundary 585, whereas only 3 out of 7 of the transporter device paths 570 cross first boundary 580. Only seven paths are shown for ease of illustration, but in practice, many more paths can be used. Various measures of the number paths crossing a boundary can be used, e.g., the raw number of paths crossing a boundary or a percentage of the paths crossing the boundary.

In some embodiments, a validation score can be determined, e.g., as a ratio of the number or percentage of paths crossing one boundary to another. For example, a ration can be taken of the percentage of paths that cross second boundary 585 relative to the percentage of paths that cross first boundary 580. In such a case, a validation score greater than one can indicate that new pin 510 is more accurate. However, a threshold increase in accuracy can be required, e.g., an increase of at least 10%, 20%, etc. can be required. Corresponding thresholds (e.g., 1.1, 1.2, etc.) can be used. If the validation score is greater than the threshold, then the new pin location can be used to update the existing pin location.

An improved pin location for the retrieval location or the delivery location can significantly improve and overall delivery time, as well as individual portions of the trip, such as time from acceptance of and order by transporter and retrieval of an item, as well as a time between retrieval and delivery. Additionally, such a procedure can reduce time spent by users updating locations. And such updates can occur frequently.

IV. Updating Pin Location

The pin locations for retrieval and delivery users (e.g., merchants and end users) can be updated periodically, e.g., on a monthly cadence. In another implementation, only certain users may be updated e.g., new users. In such a case, the updating can occur after a specified number of retrievals/deliveries. The updating can occur any faster or slower rate than determining new pin locations. For example, new pins can be determined on a weekly basis, but the databases may only be updated on a monthly basis. Or, a month's worth of delivery paths can be used for determining new pin locations weekly, and the databases can be updated weekly as well.

A. Databases

Various databases or equivalently tables within a single database can store information for determining new pin locations and updating existing pin locations with the new pin locations. Generating improved pin locations can use data across multiple databases. The improved pin locations can be stored in a table.

In some implementations, data from the following databases can be used. Such database tables can be implemented in the databases described for FIG. 1. A delivery database can store information for each discrete delivery, such as a delivery ID, a merchant ID (retrieval location ID), and an estimated time of arrival (ETA) prediction table. The delivery database can also store a requested delivery time, a transporter ID for the transporter completing the delivery, a check-in time (e.g., for when the transporter arrives at a retrieval location), a pickup (retrieval) time, a wait time of the transporter at a retrieval location (e.g., determined as the difference between the check-in time and the actual retrieval time), a total time for delivery from time of order, an actual delivery time, an identifier for the delivery location (e.g., a pickup address ID).

A transporter table can store a transporter shift table, which can include a start time for a shift, an end time for a shift, and a number of deliveries. An end user database can store an end user table, which can include a user ID and any contact information. The end user database can also include any specific instructions for transporters upon arriving, e.g., a particular entrance to use for delivery.

A geo database can store an address table, which can include the pin locations, or which can be stored in a separate table in the geo database. Merchant IDs and end user IDs can point to (e.g. be in a corresponding column) for respective pin locations in the geo database.

A transporter location table can include measured location points for deliveries of transporters, e.g., corresponding to paths described herein. For example, the transporter location table can include a delivery ID for a given order (e.g., corresponding to delivery ID in delivery database) and a latitude and longitude for each of a set of measurements for each delivery. The transporter location table can also include a timestamp for each measurement. This time stamp can be compared to a timestamp in the delivery database corresponding to an actual retrieval time or delivery time.

A merchant database can store information for a given merchant, e.g., a pin location or a link to a pin location stored in another table. For example, the merchant database can include columns for a merchant identifier, a merchant address ID (e.g., a retrieval location ID that points to a pin location in an address database, such as the geo database) and a name. The merchant database can also include any specific instructions for transporters upon arriving, e.g., a particular entrance to use for retrieval. The merchant identifier can be used to cross-reference data in other tables.

Once deliveries are stored in the backend, a data pipeline can read the stored delivery rows and use them to predict pins and other associated fields, and store them in a final predicted pin table.

B. Updating Databases

After identifying new and more accurate pin locations for retrieval and delivery locations, a list of new pin locations can be assembled. As each new pin location is determined or done in batch (e.g., monthly), a location database (e.g., location database 148 or geo database described above) can be updated. The tables of the merchants and end users corresponding to the new pin locations can be updated to point to the new addresses, e.g., using an address ID. The new pin location can be the latitude and longitude coordinates, but the street address can remain the same.

FIG. 6 shows a table with new pin locations corresponding to store identifiers according to implementations. In some implementations, the pin locations can be updated in bulk. In the example below, a comma-separated values (CSV) file is used, but other types of files may be used.

A script can parse the file and extract merchant ID (or end user ID), latitude, and longitude. The store ID can be used to identify the merchant record in the merchant database and the current pin location in the location database. If the file includes all pin locations (i.e., whether updated or not), a check can be made to determine if current latitude and longitude in location database matches new latitude and longitude. If so, then control can return to the CSV file to extract the next merchant ID, latitude, and longitude.

If the latitude and longitude coordinates are different, then a check can be made to determine if the same coordinates exist in the location table, e.g., for some other end user that has a same delivery location (e.g., roommates). If the coordinates already exist in the location database, the merchant or end user record can be updated to have the pin location column (address ID) point to that entry in the location database. If the coordinates do not exist, then a new entry can be created using the new latitude and longitude coordinates. And the merchant or end user record can be updated to have the pin location column point to that entry in the location database As described above, a validation score can be assigned to the new pin location. The file with new pin locations can be ranked by the validation score, and only new pin locations with validation scores greater than a threshold can be updated. In some implementations, a flag or other highlight marking can indicate that certain validation scores might be more accurate than the existing pin but not significant higher (i.e., as measured by the threshold). In such cases, a reviewer can look at the data (e.g., retrieval/delivery location points) and determine whether the pin location should be updated.

In addition to a validation score (e.g., a ratio of the percentage of transporter paths that cross the boundaries), a number of retrievals/deliveries can be used. For example, the total number of retrievals/deliveries can be required to be greater than a threshold. Such sparse data might occur for food trucks, as they may move around to multiple spots, with each spot not having a high number of retrievals.

V. Methods

Embodiments can use measurements from transporter devices to refine and update pin locations stored in a databases for records corresponding to retrieval and delivery locations.

A. Predicting Pins for Retrieval Locations

Figure 7:
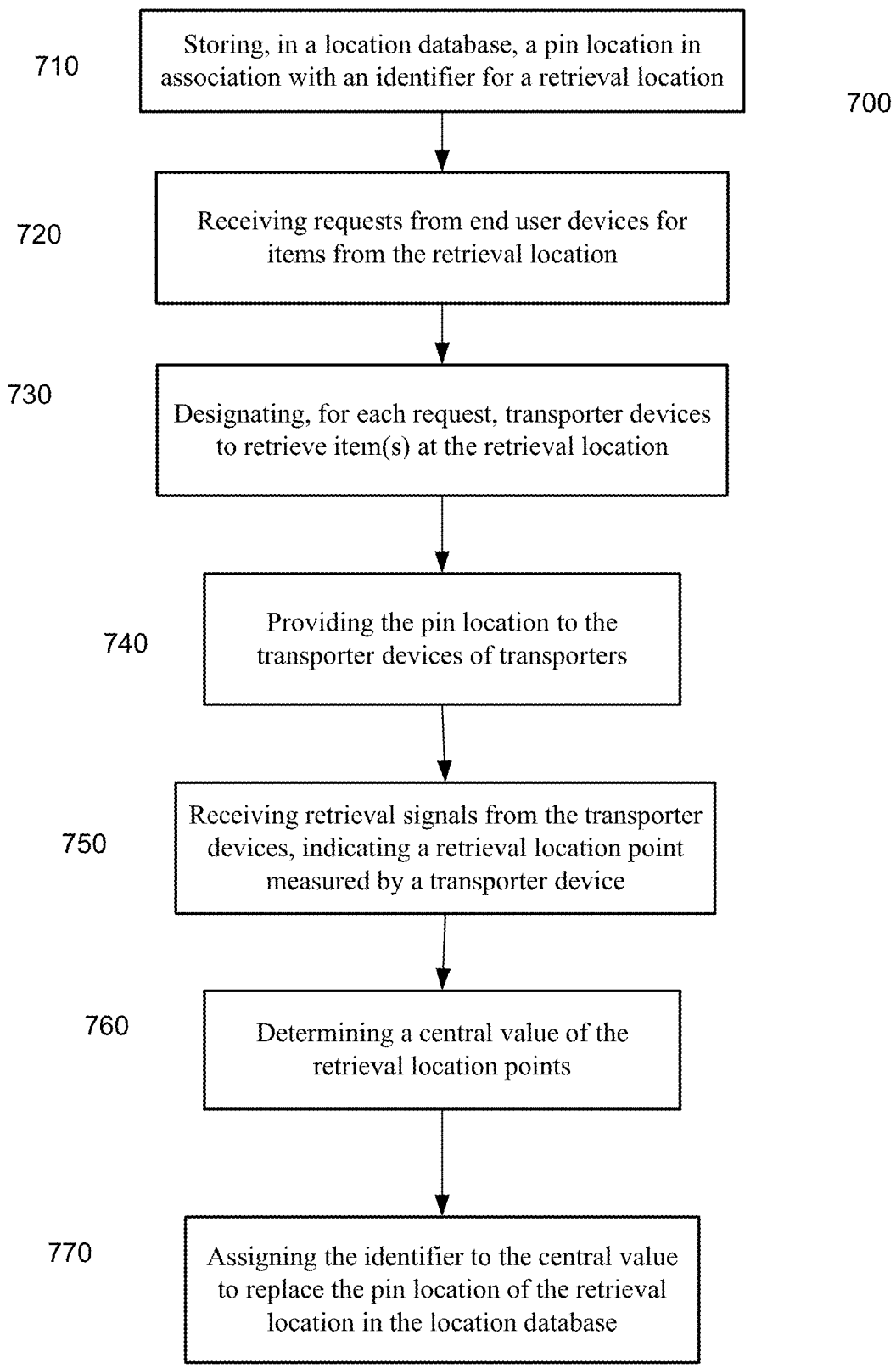
FIG. 7 is a flowchart illustrating a method for updating a pin location for a retrieval location in a database according to implementations.

FIG. 7 is a flowchart illustrating a method 700 for updating a pin location for a retrieval location in a database according to implementations. Method 700 can be performed by the example server computer computers provided herein, such as server computer 102 of FIG. 1, server computer 402 of FIG. 4, and a server computer 502 of FIG. 5.

At block 710, a location database stores a pin location in association with an identifier for a retrieval location. The location database can be location database 148 in FIG. 1. The identifier can be for one record (e.g., for a merchant) and point to the pin location in the location database. The pin location can be determined to be updated based on an error with a comparison to a stored location from a mapping service.

At block 720, a plurality of requests is received, over a network, from end user devices. The end user device (e.g., end user device 132 in FIG. 1) can run a user application (e.g., end user application 134) that interfaces with the server computer. The requests can be for items from the retrieval location (e.g., a particular merchant).

At block 730, for each of the plurality of requests, one of a plurality of transporter devices of transporters is designated to retrieve one or more items at the retrieval location. The designation can be based on which transporter device is in a best position to the retrieval and delivery locations. The plurality of transporter devices (e.g., transporter device 125) can run a transporter application (e.g., transporter application 127) that interfaces with the server computer.

At block 740, the pin location can be provided, over the network, to the plurality of transporter devices of transporters. The transporter device can use the pin location for navigation and other purposes.

At block 750, retrieval signals are received, over the network, from the plurality of transporter devices. A retrieval signal can indicate a retrieval location point measured by a transporter device, e.g., by providing a time stamp that can be correlated to a location measurement or by directly providing a measured location (e.g., latitude and longitude coordinates). Accordingly, the retrieval signal can include the retrieval location point measured by the transporter device.

In another example, the retrieval signal includes a first time stamp that can be used identify a corresponding location point. A plurality of location points and corresponding time stamps from the transporter device can be received, e.g., GPS measurements can be measured with a time stamp at the time of the measurement. The retrieval location point can be determined by selecting one of the plurality of locations points. The selection can be determined by comparing the first time stamp to the corresponding time stamps.

The retrieval signal can be generated responsive to an input at the transporter device, e.g., in response to a swipe for pickup or a swipe to check in. As further examples, voice commands can be used as the input. The input can indicate retrieval of the one or more items at the retrieval location, e.g., that the items have been picked up or are about to be picked up, as may occur when a transporter has arrived (checked in) and is waiting for the one or more items. Accordingly, the input can be received when the transporter device is at the retrieval location but before retrieval of the one or more items.

At block 760, a central value of the retrieval location points is determined. As described herein, the central value can include a longitude median of the retrieval location points and a latitude median of the retrieval location points. Prior to determining the central value, a portion of the retrieval location points can be identified and filtered out. For example, location points below 5% and above 95% of other locations points can be removed.

At block 770, the identifier is assigned to the central value to replace the pin location of the retrieval location in the location database. As part of assigning the identifier to the central value, the central value can be added in the location database. The identifier can be updated in a database record corresponding to the retrieval location, e.g., by pointing to the central value in the location database.

After updating the pin location, a new request for an item from the retrieval location can be received. The central value can be provided, to a designated transporter device, as the pin location for the retrieval location.

As described above, a validation (accuracy) check can be performed for the central value (new pin) relative to the existing pin before updating the pin location. For example, as described for FIG. 5, path location information can be received from the plurality of transporter devices. The path location information can be measured along paths of the plurality of transporter devices prior to measurement of the retrieval location points. A first boundary can be assigned (e.g., generated) around the pin location (e.g., first boundary 580). A first number (or percentage of paths for the retrieval location) of the paths that intersect with the first boundary can be determined using the path location information. A second boundary (e.g., second boundary 58) is assigned around the central value. A second number (or percentage of paths for the retrieval location) of the paths that intersect with the second boundary can be determined using the path location information. The second number is compared with the first number, e.g., by determining a ratio and comparing the ratio to a threshold. It can then be determined to replace the pin location with the central value based the comparison.

B. Predicting Pins for Delivery Locations

The delivery location can be updated in a similar manner as the retrieval locations. One difference is that the delivery location may be updated over a longer timeframe, e.g., as an end user received fewer deliveries than a merchant has retrievals. For merchants, a 30 day lookback can be used for retrievals, whereas for end users, a lookback of 180 days can be used. And, the updates of the end user can be check less frequently, e.g., monthly vs weekly.

Figure 8:
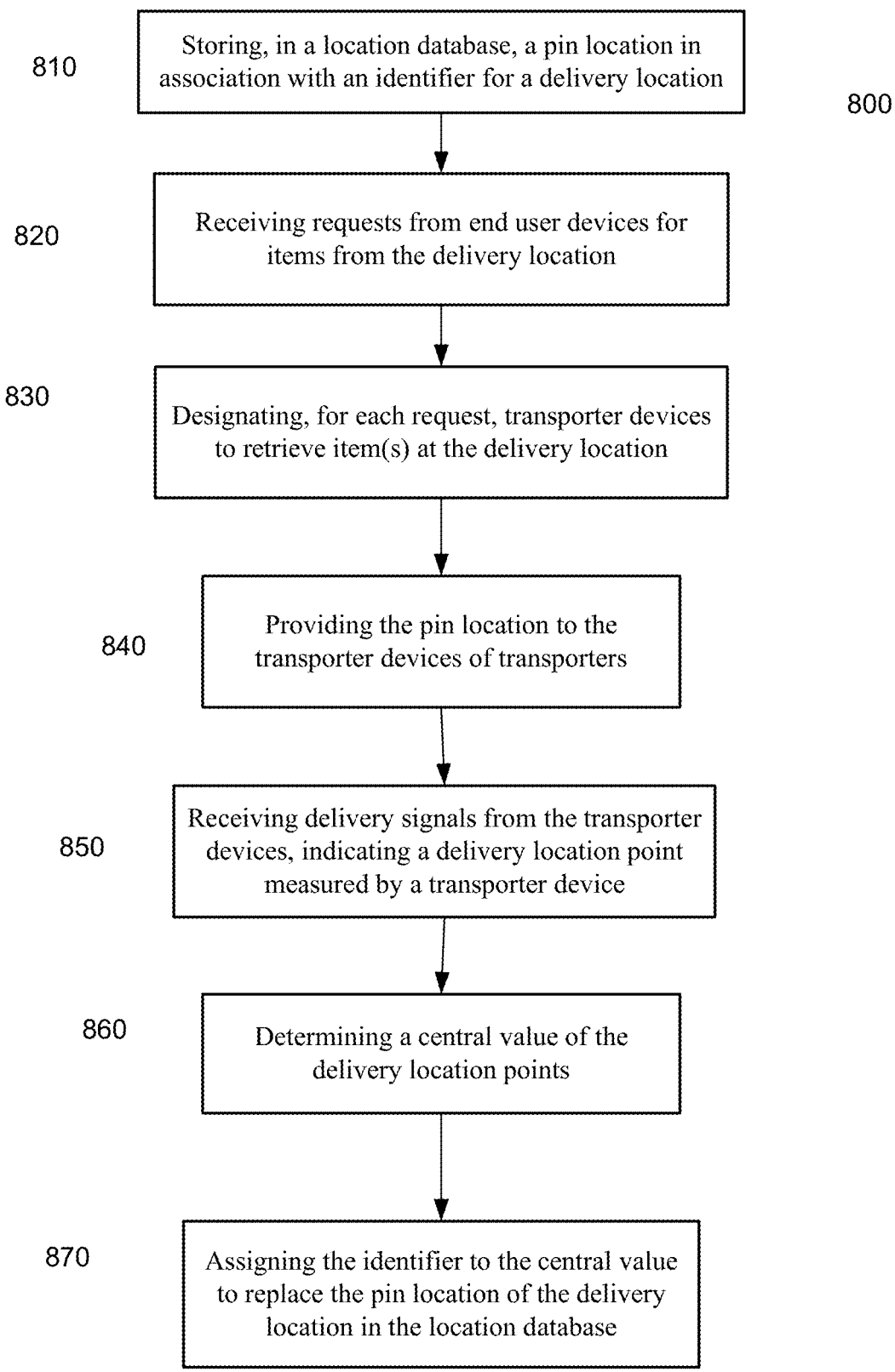
FIG. 8 is a flowchart illustrating a method for updating a pin location for a delivery location in a database according to implementations.

FIG. 8 is a flowchart illustrating a method 800 for updating a pin location for a delivery location in a database according to implementations. Method 800 can be performed by the example server computer computers provided herein, such as server computer 102 of FIG. 1, server computer 402 of FIG. 4, and a server computer 502 of FIG. 5.

At block 810, a location database stores a pin location in association with an identifier for a delivery location. The location database can be location database 148 in FIG. 1. The identifier can be for one record (e.g., for an end user) and point to the pin location in the location database. The pin location can be determined to be updated based on an error with a comparison to a stored location from a mapping service.

At block 820, a plurality of requests is received, over a network, from end user devices. The end user device (e.g., end user device 132 in FIG. 1) can run a user application (e.g., end user application 134) that interfaces with the server computer. The requests can be for a particular delivery location (e.g., a particular end user).

At block 830, for each of the plurality of requests, one of a plurality of transporter devices of transporters is designated to deliver one or more items at the delivery location. The designation can be based on which transporter device is in a best position to the delivery and delivery locations. The plurality of transporter devices (e.g., transporter device 125) can run a transporter application (e.g., end user application 134) that interfaces with the server computer.

At block 840, the pin location can be provided, over the network, to the plurality of transporter devices of transporters. The transporter device can use the pin location for navigation and other purposes.

At block 850, delivery signals are received, over the network, from the plurality of transporter devices. A delivery signal can indicate a delivery location point measured by a transporter device, e.g., by providing a time stamp that can be correlated to a location measurement or by directly providing a measured location (e.g., latitude and longitude coordinates). Accordingly, the delivery signal can include the delivery location point measured by the transporter device.

In another example, the delivery signal includes a first time stamp that can be used identify a corresponding location point. A plurality of location points and corresponding time stamps from the transporter device can be received, e.g., GPS measurements can be measured with a time stamp at the time of the measurement. The delivery location point can be determined by selecting one of the plurality of locations points. The selection can be determined by comparing the first time stamp to the corresponding time stamps.

The delivery signal can be generated responsive to an input at the transporter device, e.g., in response to a swipe or a voice command. The input can indicate delivery of the one or more items at the delivery location.

At block 860, a central value of the delivery location points is determined. As described herein, the central value can include a longitude median of the delivery location points and a latitude median of the delivery location points. Prior to determining the central value, a portion of the delivery location points can be identified and filtered out. For example, location points below 5% and above 95% of other locations points can be removed.

At block 870, the identifier is assigned to the central value to replace the pin location of the delivery location in the location database. As part of assigning the identifier to the central value, the central value can be added in the location database. The identifier can be updated in a database record corresponding to the delivery location, e.g., by pointing to the central value in the location database.

After updating the pin location, a new request for an item from the delivery location can be received. The central value can be provided, to a designated transporter device, as the pin location for the delivery location.

As described above, a validation (accuracy) check can be performed for the central value (new pin) relative to the existing pin before updating the pin location. For example, as described for FIG. 5, path location information can be received from the plurality of transporter devices. The path location information can be measured along paths of the plurality of transporter devices prior to measurement of the delivery location points. A first boundary can be assigned (e.g., generated) around the pin location (e.g., first boundary 580). A first number (or percentage of paths for the delivery location) of the paths that intersect with the first boundary can be determined using the path location information. A second boundary (e.g., second boundary 58) is assigned around the central value. A second number (or percentage of paths for the delivery location) of the paths that intersect with the second boundary can be determined using the path location information. The second number is compared with the first number, e.g., by determining a ratio and comparing the ratio to a threshold. It can then be determined to replace the pin location with the central value based the comparison.

VI. Server Computer

Figure 9:
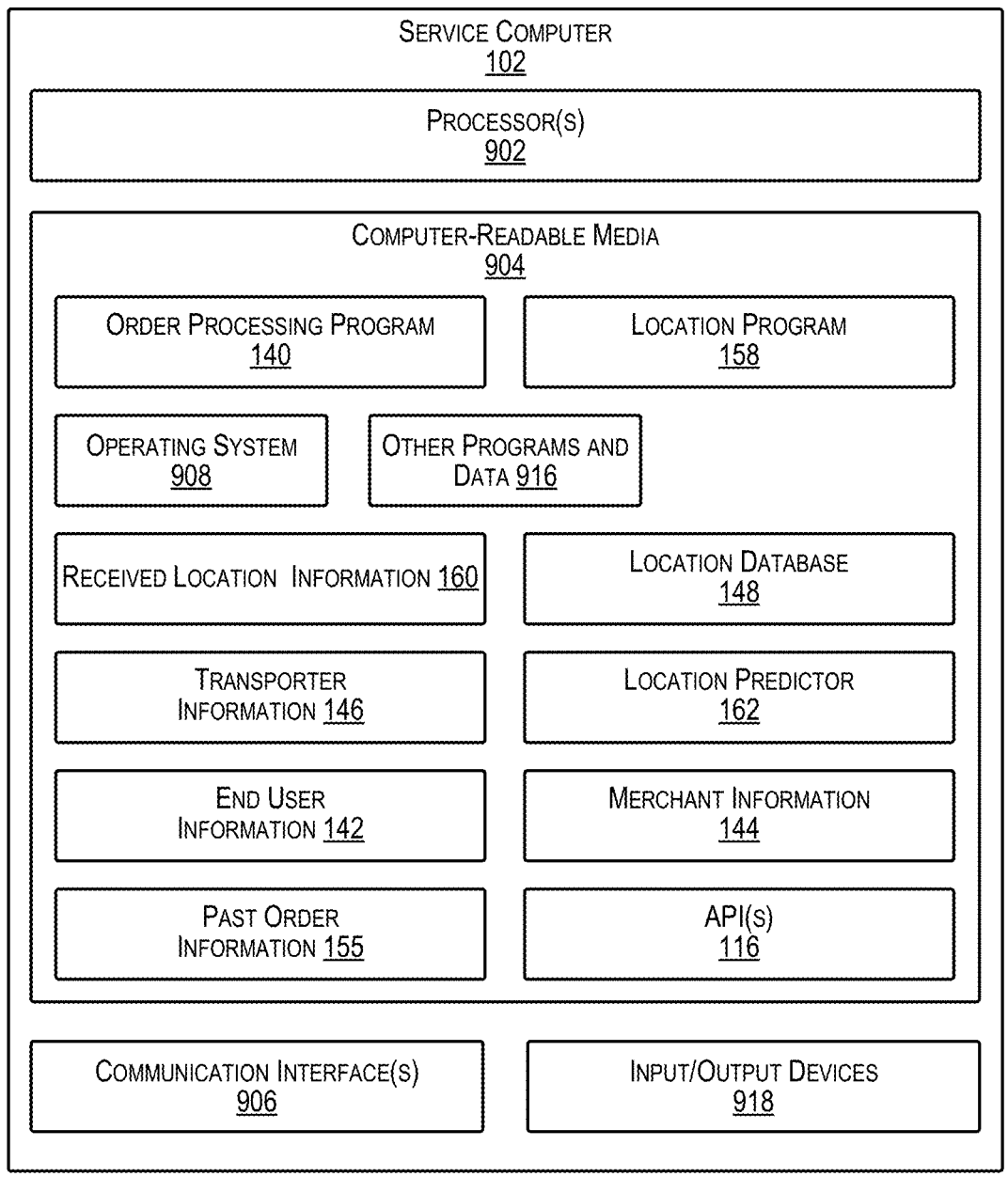
FIG. 9 illustrates select components of the server computer that may be used to implement some functionality of the transporter management and order processing services described herein.

FIG. 9 illustrates select components of the server computer 102 that may be used to implement some functionality of the transporter management and order processing services described herein. The service computing device 102 may include one or more servers or other types of computing devices that may be embodied in any number of ways. For instance, in the case of a server, the programs, other functional components, and data may be implemented on a single server, a cluster of servers, a server farm or data center, a cloud-hosted computing service, and so forth, although other computer architectures may additionally or alternatively be used.

Further, while the figures illustrate the components and data of the server computer 102 as being present in a single location, these components and data may additionally or alternatively be distributed across different computing devices and different locations in any manner. Consequently, the functions may be implemented by one or more service computing devices, with the various functionality described above distributed in various ways across the different computing devices. Multiple service computing devices of server computer 102 may be located together or separately, and organized, for example, as virtual servers, server banks and/or server farms. The described functionality may be provided by the servers of a single entity or enterprise, or may be provided by the servers and/or services of multiple different entities or enterprises.

In the illustrated example, each service computing device of server computer 102 may include one or more processors 902, one or more computer-readable media 904, and one or more communication interfaces 906. Each processor 902 may be a single processing unit or a number of processing units, and may include single or multiple computing units or multiple processing cores. The processor(s) 902 can be implemented as one or more microprocessors, microcomputers, microcontrollers, digital signal processors, central processing units, state machines, logic circuitries, and/or any devices that manipulate signals based on operational instructions. For instance, the processor(s) 902 may be one or more hardware processors and/or logic circuits of any suitable type specifically programmed or configured to execute the algorithms and processes described herein. The processor(s) 902 can be configured to fetch and execute computer-readable instructions stored in the computer-readable media 804, which can program the processor(s) 902 to perform the functions described herein.

The computer-readable media 904 may include volatile and nonvolatile memory and/or removable and non-removable media implemented in any type of technology for storage of information, such as computer-readable instructions, data structures, program modules, or other data. Such computer-readable media 904 may include, but is not limited to, RAM, ROM, EEPROM, flash memory or other memory technology, optical storage, solid state storage, magnetic tape, magnetic disk storage, storage arrays, network attached storage, storage area networks, cloud storage, or any other medium that can be used to store the desired information and that can be accessed by a computing device. Depending on the configuration of the service computing device 102, the computer-readable media 904 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 904 may be used to store any number of functional components that are executable by the processors 902. In many implementations, these functional components comprise instructions or programs that are executable by the processors 902 and that, when executed, specifically configure the one or more processors 902 to perform the actions attributed above to server computer 102. Functional components stored in the computer-readable media 904 may include the order processing program 140, and location program 158, as discussed above.

Additional functional components stored in the computer-readable media 904 may include an operating system 908 for controlling and managing various functions of server computer 102.

In addition, the computer-readable media 904 may store data used for performing the operations described herein. Thus, the computer-readable media 904 may store received location information 160, location database 148, transporter information 146, end user information 142, merchant information 144, and past order information 155. Some or all of this information may be maintained in one or more relational databases or any other suitable type of databases or other data structure(s), as will be apparent to those of skill in the art having the benefit of the disclosure herein. Furthermore, the computable readable media 904 may store location predictor 162 and the one or more APIs 116, such as information and libraries related to the one or more APIs 116. Server computer 102 may also include or maintain other functional components and data not specifically shown in FIG. 9, such as other programs and data 916, which may include programs, applications, modules, drivers, etc., and the data used or generated by the functional components. Further, server computer 102 may include many other logical, programmatic and physical components, of which those described above are merely examples that are related to the discussion herein.

The communication interface(s) 906 may include one or more interfaces and hardware components for enabling communication with various other devices, such as over the network(s) 106. For example, communication interface(s) 906 may enable communication through one or more of the Internet, cable networks, cellular networks, wireless networks (e.g., Wi-Fi) and wired networks, as well as close-range communications such as BLUETOOTH® and the like, as additionally enumerated elsewhere herein.

The service computing device 102 may further be equipped with various input/output (I/O) devices 918. Such I/O devices 918 may include a display, various user interface controls (e.g., buttons, joystick, keyboard, mouse, touch screen, etc.), audio speakers, connection ports and so forth.

VII. Client Devices

Figure 10:
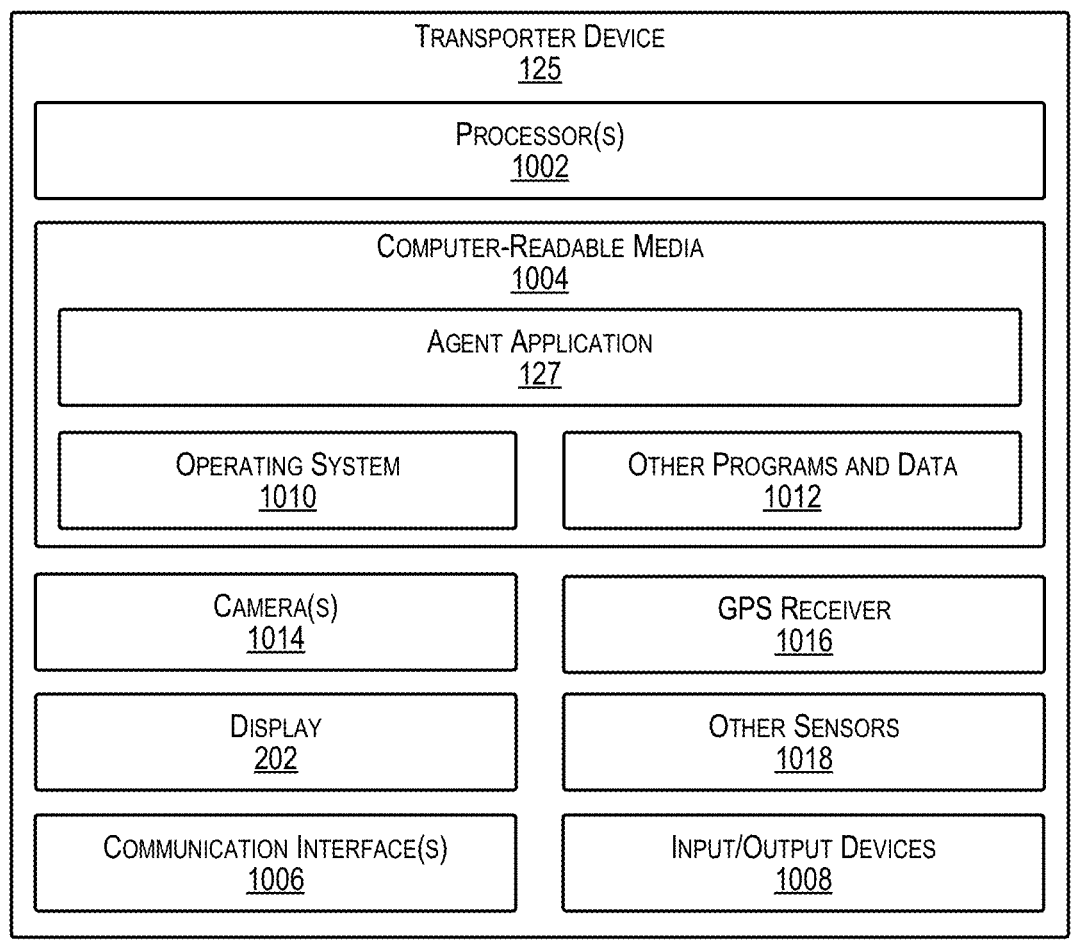
FIG. 10 illustrates select example components of the transporter device that may implement the functionality described above according to some examples.

FIG. 10 illustrates select example components of transporter device 125 that may implement the functionality described above according to some examples. Transporter device 125 may be any of a number of different types of portable computing devices. Some examples of transporter device 125 may include smart phones and mobile communication devices; tablet computing devices; laptops, netbooks and other portable computers; wearable computing devices and/or body-mounted computing devices, which may include watches and augmented reality devices, such as helmets, goggles or glasses; and any other portable device capable of sending communications and performing the functions according to the techniques described herein.

In the example of FIG. 10, transporter device 125 includes components such as at least one processor 1002, one or more computer-readable media 1004, one or more communication interfaces 1006, and one or more input/output (I/O) devices 1008. Each processor 1002 may itself comprise one or more processors or processing cores. For example, processor 1002 can be implemented as one or more microprocessors, microcomputers, microcontrollers, digital signal processors, central processing units, state machines, logic circuitries, and/or any devices that manipulate signals based on operational instructions. In some cases, processor 1002 may be one or more hardware processors and/or logic circuits of any suitable type specifically programmed or configured to execute the algorithms and processes described herein. The processor 1002 can be configured to fetch and execute computer-readable processor-executable instructions stored in the computer-readable media 1004.

Depending on the configuration of transporter device 125, the computer-readable media 1004 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 1004 may include, but is not limited to, RAM, ROM, EEPROM, flash memory, solid-state storage, magnetic disk storage, optical storage, and/or other computer-readable media technology. Further, in some cases, transporter device 125 may access external storage, such as storage arrays, network attached storage, storage area networks, cloud storage, or any other medium that can be used to store information and that can be accessed by processor 1002 directly or through another computing device or network. Accordingly, computer-readable media 1004 may be computer storage media able to store instructions, programs or components that may be executed by processor 1002. Further, when mentioned, non-transitory computer-readable media exclude media such as energy, carrier signals, electromagnetic waves, and signals per se.

Computer-readable media 1004 may be used to store and maintain any number of functional components that are executable by processor 1002. In some implementations, these functional components comprise instructions or programs that are executable by the processor 1002 and that, when executed, implement operational logic for performing the actions and services attributed above to transporter device 125. Functional components of transporter device 125 stored in computer-readable media 1004 may include transporter application 127, as discussed above, which may present the transporter with one or more user interfaces, some examples of which are described above. Additional functional components may include an operating system 1010 for controlling and managing various functions of transporter device 125 and for enabling basic user interactions with transporter device 125.

In addition, computer-readable media 1004 may also store data, data structures and the like, that are used by the functional components. Depending on the type of transporter device 125, the computer-readable media 1004 may also optionally include other functional components and data, such as other programs and data 1012, which may include applications, modules, drivers, etc., and the data used or generated by the functional components. Further, transporter device 125 may include many other logical, programmatic and physical components, of which those described are merely examples that are related to the discussion herein.

The communication interface(s) 1006 may include one or more interfaces and hardware components for enabling communication with various other devices, such as over the network(s) 106 or directly. For example, communication interface(s) 1006 may enable communication through one or more of the Internet, cable networks, cellular networks, wireless networks (e.g., Wi-Fi) and wired networks, as well as close-range communications such as BLUETOOTH®, and the like, as additionally enumerated elsewhere herein.

FIG. 10 further illustrates that transporter device 125 may include display 202. Depending on the type of computing device used as transporter device 125, the display may employ any suitable display technology. In some examples, display 202 may have a touch sensor associated with display 202 to provide a touchscreen display configured to receive touch inputs for enabling interaction with a user interface presented on display 202.

Transporter device 125 may further include the one or more I/O devices 908. The I/O devices 1008 may include speakers, a microphone, and various user controls (e.g., buttons, a joystick, a keyboard, a keypad, etc.), a haptic output device, and so forth.

Transporter device 125 may further include one or more cameras 1014 that may be used for capturing images with transporter device 125. For instance, the camera may be accessed by transporter application 139 when capturing the images described herein. Alternatively, a separate native camera application may be included with the other programs and data 1012 and may be used for capturing the images described herein.

Other components included in transporter device 125 may include various types of sensors, which may include a GPS receiver 1016 able to indicate location information to the transporter application 127, the operating system 1010, and/or the other programs 1012. The transporter device 125 may further include other sensors 1018, such as an altimeter, accelerometer, gyroscope, compass, proximity sensor, and the like. Additionally, transporter device 125 may include various other components that are not shown, examples of which include removable storage, a power source, such as a battery and power control unit, and so forth.

Further, end user device 132 and/or merchant device 128 may include hardware structures and components similar to those described for the transporter device, but with one or more different functional components. For example, end user device 132 and merchant device 128 may include end user application 134 and merchant application 130, respectively, instead of transporter application 127.

Various instructions, methods and techniques described herein may be considered in the general context of computer-executable instructions, such as software programs stored on computer-readable media, and executed by the processor(s) herein. Generally, programs include applications, routines, modules, objects, components, data structures, executable code, etc., for performing particular tasks or implementing particular abstract data types. These programs and the like may be executed as native code or may be downloaded and executed, such as in a virtual machine or other just-in-time compilation execution environment. Typically, the functionality of the programs may be combined or distributed as desired in various implementations. An implementation of these programs and techniques may be stored on computer storage media or transmitted across some form of communication media.

A suitable non-transitory computer readable medium can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The computer readable medium may be any combination of such devices. In addition, the order of operations may be re-arranged. A process can be terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Any operations performed with a processor may be performed in real-time. The term "real-time" may refer to computing operations or processes that are completed within a certain time constraint. The time constraint may be 1 minute, 1 hour, 1 day, or 7 days. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the disclosure. However, other embodiments of the disclosure may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art. Where a conflict exists between the instant application and a reference provided herein, the instant application shall dominate.

What is claimed is:

1. A method comprising performing, by a server computer:
   storing, in a location database, a pin location in association with an identifier for a retrieval location;
   receiving, over a network, a plurality of requests from end user devices running a user application that interfaces with the server computer, the plurality of requests are for items from the retrieval location;
   for each of the plurality of requests, designating one of a plurality of transporter devices of transporters to retrieve one or more items at the retrieval location, the plurality of transporter devices running a transporter application that interfaces with the server computer;
   providing, over the network, the pin location to the plurality of transporter devices of transporters;
   receiving, over the network, retrieval signals from the plurality of transporter devices, wherein a retrieval signal provides information for a retrieval location point measured by a transporter device, the retrieval signal generated responsive to an input at the transporter device, the input indicating retrieval of the one or more items at the retrieval location;
   determining a central value of the retrieval location points, as a candidate new pin location for the retrieval location;
   determining a first geofence surrounding the pin location, wherein the pin location is within the first geofence;
   determining a second geofence surrounding the candidate new pin location, wherein the candidate new pin location is within the second geofence;
   determining a first number of paths intersecting the first geofence, each of the first number of the paths corresponding to a path of each individual transporter device of first transporter devices;
   determining a second number of paths intersecting the second geofence, each of the second number of the paths corresponding to a path of each individual transporter device of second transporter devices;
   determining that the second number of the paths intersecting the second geofence is greater than the first number of the paths intersecting the first geofence; and
   assigning the identifier to the central value to replace the pin location of the retrieval location in the location database with a new pin location corresponding to the central value, in response to the second number of the paths being greater than the first number of the paths,
   wherein the first transporter devices and the second transporter devices are included in the plurality of transporter devices.

2. The method of claim 1, further comprising:
   receiving, from the plurality of transporter devices, path location information measured along paths of the plurality of transporter devices prior to measurement of the retrieval location points,
   wherein the first number of the paths and the second number of the paths are determined using the path location information.

3. The method of claim 1, further comprising:
   prior to determining the central value, identifying and filtering out a portion of the retrieval location points.

4. The method of claim 1, wherein the central value includes a longitude median of the retrieval location points and a latitude median of the retrieval location points.

5. The method of claim 1, wherein the input is received when the transporter device is at the retrieval location but before retrieval of the one or more items.

6. The method of claim 1, wherein the retrieval signal includes the retrieval location point measured by the transporter device.

7. The method of claim 1, wherein the retrieval signal includes a first time stamp, the method further comprising: receiving a plurality of location points and corresponding time stamps from the transporter device; and determining the retrieval location point by selecting one of the plurality of location points, the selecting determined by comparing the first time stamp to the corresponding time stamps.

8. The method of claim 1, further comprising:
   receiving a new request for an item from the retrieval location; and
   providing, to a designated transporter device, the central value as the pin location for the retrieval location.

9. The method of claim 1, wherein assigning the identifier to the central value includes:
   adding the central value in the location database; and
   updating the identifier in a database record corresponding to the retrieval location, wherein the identifier is updated to point to the central value in the location database.

10. A method comprising performing, by a server computer:
   storing, in a location database, a pin location in association with an identifier for a delivery location;
   receiving, over a network, a plurality of requests from end user devices running an application that interfaces with the server computer, the plurality of requests are for items to deliver to the delivery location;
   for each of the plurality of requests, designating one of a plurality of transporter devices of transporters to deliver one or more items to the delivery location, the plurality of transporter devices running the application that interfaces with the server computer;
   providing, over the network, the pin location to the plurality of transporter devices of transporters;
   receiving, over the network, delivery signals from the plurality of transporter devices, wherein a delivery signal indicates a delivery location point measured by a transporter device, the delivery signal generated responsive to an input at the transporter device, the input indicating delivery of the one or more items to the delivery location;
   determining a central value of the delivery location points, as a candidate new pin location for the delivery location;
   determining a first geofence surrounding the pin location, wherein the pin location is within the first geofence;
   determining a second geofence surrounding the candidate new pin location, wherein the candidate new pin location is within the second geofence;
   determining a first number of paths intersecting the first geofence, each of the first number of the paths corresponding to a path of each individual transporter device of first transporter devices;
   determining a second number of paths intersecting the second geofence, each of the second number of the paths corresponding to a path of each individual transporter device of second transporter devices;
   determining that the second number of the paths intersecting the second geofence is greater than the first number of the paths intersecting the first geofence; and
   assigning the identifier to the central value to replace the pin location of the delivery location in the location database with a new pin location corresponding to the central value, in response to the second number of the paths being greater than the first number of the paths, wherein the first transporter devices and the second transporter devices are included in the plurality of transporter devices.

11. A server computer comprising:

a processor; and a non-transitory computer readable medium, the non-transitory computer readable medium comprising instructions, executable by the processor, for implementing operations including:

storing, in a location database, a pin location in association with an identifier for a retrieval location;

receiving, over a network, a plurality of requests from end user devices running a user application that interfaces with the server computer, the plurality of requests are for items from the retrieval location;

for each of the plurality of requests, designating one of a plurality of transporter devices of transporters to retrieve one or more items at the retrieval location, the plurality of transporter devices running a transporter application that interfaces with the server computer;

providing, over the network, the pin location to the plurality of transporter devices of transporters;

receiving, over the network, retrieval signals from the plurality of transporter devices, wherein a retrieval signal provides information for a retrieval location point measured by a transporter device, the retrieval signal generated responsive to an input at the transporter device, the input indicating retrieval of the one or more items at the retrieval location;

determining a central value of the retrieval location points, as a candidate new pin location for the retrieval location;

determining a first geofence surrounding the pin location, wherein the pin location is within the first geofence;

determining a second geofence surrounding the candidate new pin location, wherein the candidate new pin location is within the second geofence;

determining a first number of paths intersecting the first geofence, each of the first number of the paths corresponding to a path of each individual transporter device of first transporter devices;

determining a second number of paths intersecting the second geofence, each of the second number of the paths corresponding to a path of each individual transporter device of second transporter devices;

determining that the second number of the paths intersecting the second geofence is greater than the first number of the paths intersecting the first geofence; and assigning the identifier to the central value to replace the pin location of the retrieval location in the location database with a new pin location corresponding to the central value, in response to the second number of the paths being greater than the first number of the paths, wherein the first transporter devices and the second transporter devices are included in the plurality of transporter devices.

12. The server computer of claim 11, wherein the operations further include:

receiving, from the plurality of transporter devices, path location information measured along paths of the plurality of transporter devices prior to measurement of the retrieval location points, wherein the first number of the paths and the second number of the paths are determined using the path location information.

13. The server computer of claim 11, wherein the operations further include:

determining that the pin location is to be updated based on an error with a comparison to a stored location from a mapping service.

14. The server computer of claim 11, wherein the operations further include:

prior to determining the central value, identifying and filtering out a portion of the retrieval location points.

15. The server computer of claim 11, wherein the central value includes a longitude median of the retrieval location points and a latitude median of the retrieval location points.

16. The server computer of claim 11, wherein the retrieval signal includes a first time stamp, the operations further including: receiving a plurality of location points and corresponding time stamps from the transporter device; and determining the retrieval location point by selecting one of the plurality of location points, the selecting determined by comparing the first time stamp to the corresponding time stamps.

17. The server computer of claim 11, wherein the operations further include:

receiving a new request for an item from the retrieval location; and providing, to a designated transporter device, the central value as the pin location for the retrieval location.

18. The server computer of claim 11, wherein assigning the identifier to the central value includes:

adding the central value in the location database; and updating the identifier in a database record corresponding to the retrieval location, wherein the identifier is updated to point to the central value in the location database.

* * * * *